UNITED STATES PATENT OFFICE

VINCENT A. LAUDERMAN, OF HAMILTON, OHIO, ASSIGNOR TO THE CHAMPION COATED PAPER CO., OF HAMILTON, OHIO, A CORPORATION OF OHIO

PIGMENT FOR COATED PAPER

No Drawing. Application filed October 23, 1928. Serial No. 314,546.

This invention relates to a process of treating lime sludge for the production of a pigment for coated paper, and to the product obtained by this process.

"Lime sludge" as herein designated, is the sludge or mud obtained as a by-product in the causticization of sodium carbonate by lime. It consists chiefly of calcium carbonate, together with some calcium hydroxide (usually from 1 to 8% on the dry basis) and a small amount of sodium hydroxide. The amounts of calcium hydroxide and sodium hydroxide vary with the proportion of lime and sodium carbonate used, and with the amount of washing given the product. The lime sludge may also contain impurities such as those derived from the original materials but so long as these impurities do not materially color the sludge, they do not detract from its usefulness for the present purpose.

Lime sludge is of very little commercial value and is generally considered a nuisance. It is frequently thrown away, although it is sometimes reburned for the production of quicklime. As such, it is of little value as a pigment for coated paper. On the basis of its calcium carbonate content it might serve as a substitute for whiting or chalk which has long been used as an ingredient of paper coatings, being limited however to dull finished papers due to the relatively large size of the calcium carbonate crystals.

The presence of free calcium hydroxide moreover is detrimental to normal coating mixtures. If casein is used as adhesive in the coating mixture, the calcium hydroxide unites with the casein presumably to form calcium caseinate with an objectionable thickening of the coating. If starch is used as the adhesive, a lime starch compound is formed which has little or no adhesive value.

Briefly, the invention consists in treating the lime sludge with aluminum sulfate in sufficient quantity to combine with its calcium hydroxide content to the formation of an equivalent amount of satin white. Satin white is a valuable pigment for coated paper, characterized by its extremely white color and its small particle size, the latter property giving to papers coated with it, the ability to take a high gloss or finish. It is normally produced by adding a solution of aluminum sulfate to a suspension of hydrated lime. Most probably it is a mixture of calcium sulfate and hydrated tricalcium aluminate.

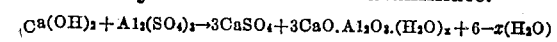

The treatment of the lime sludge with aluminum sulfate therefore results in two beneficial effects: (1) it neutralizes the calcium hydroxide, and (2) it simultaneously produces satin white.

One method of carrying out this invention is first to wash the crude lime sludge with water to remove the small amount of sodium hydroxide. This washing operation, although not essential to the invention, is nevertheless an economical procedure, as otherwise the sodium hydroxide reacts with a proportional part of the aluminum sulfate to the production of aluminum hydrate and sodium sulfate, the former being a rather poor pigment and the latter being soluble in water. After removal of the sodium hydroxide, the lime sludge is filtered and agitated in the presence of sufficient water to obtain good mixing, and sufficient aluminum sulfate is added slowly to neutralize the calcium hydroxide. The resulting product is filter-pressed and may then be ground, for example in a ball mill. It is then in suitable form for use as a pigment in coating paper.

An advantageous way of carrying out the invention is to add dry aluminum sulfate in quantity sufficient to react with the calcium hydroxide to the lime sludge in a closed container with agitation. As the aluminum sulfate goes into solution it reacts with the calcium hydroxide to form satin white.

It frequently happens that during the grinding operations the slurry develops an alkaline reaction. This is due to small amounts of calcium hydroxide occluded in the mass, which become exposed on grinding. If the amount of calcium hydroxide thus exposed is very small, for example less than .5% of the dry pigment, it may be neglected, otherwise it is advisable to add more aluminum sulfate to neutralize it.

The entire treatment of the lime sludge may be advantageously carried out in a ball mill, after first removing the caustic soda. In this method the amount of aluminum sulfate to be added is calculated from the calcium hydroxide analysis of the sludge. The required amount of dry aluminum sulfate is then added, preferably in dry form, to the sludge in the ball mill. The aluminum sulfate may be added all at once, or in several batches during the grinding operation. By this procedure, one obtains the advantage of conserving aluminum sulfate (by preventing or reducing loss of $CO_2$) and at the same time one may readily obtain practically complete neutralization of the calcium hydroxide and grinding of the sludge in one operation.

The following example is further illustrative of the invention: A quantity of lime sludge equivalent to 600 lbs. of dry solids was washed with water to remove caustic soda, and then filtered. On the dry basis, the sludge contained 6.6% $Ca(OH)_2$. The filter cake was then transferred to a vat, slurried with water and dry aluminum sulfate added until the calcium hydroxide was neutralized, the mass being agitated during this treatment. The quantity of aluminum sulfate

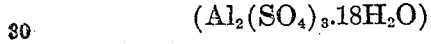
$$(Al_2(SO_4)_3 \cdot 18H_2O)$$

used was 39 lbs. The neutralized sludge was filter-pressed, and the mass ground in an Abbe ball mill.

An amount of dry satin white equivalent to about 10% of the total dry solids in the pigment is sufficient to impart a good gloss to the coated paper when finished in the usual fashion on supercalenders. Calcium hydroxide amounting to 5% of the total solids in the sludge will give a satin white content of approximately 10%. Should the lime sludge contain less than approximately 5% of calcium hydroxide, satin white may be added directly to the sludge to bring the content up to approximately 10%. Of course, a pigment containing less than 10% of satin white may be used, but the finish will then be somewhat duller.

Paper coated with pigment made according to the above described process has a finish equal to that of the normal clay coatings. The paper is also brighter than clay coated papers and is considerably cheaper.

The pigment resulting from the process herein described appears to produce paper having a higher finish than paper prepared from equivalent quantities of precipitated calcium carbonate and satin white by simply mixing these two ingredients. In other words, the formation of the satin white in place seems to exert a greater influence than if it were simply added to calcium carbonate.

As will be apparent, my invention embraces any equivalent of lime sludge, i. e., any material consisting essentially of precipitated calcium carbonate and containing calcium oxide or hydroxide with or without sodium hydroxide and with or without harmless impurities such as might be obtained, for instance, by scrubbing gases containing carbon dioxide with a calcium hydroxide or milk of lime.

I claim:

1. Process of converting lime sludge into a pigment suitable for use in coated paper which comprises adding aluminum sulphate to lime sludge in quantities sufficient to combine with substantially all of the free alkali in the lime sludge.

2. Process of converting lime sludge into a pigment suitable for use in coated paper which comprises neutralizing substantially all the free alkali in lime sludge by means of aluminum sulphate to produce a mixture of calcium carbonate and satin white, and grinding.

3. Process of converting lime sludge into a pigment suitable for use in coated paper which comprises washing crude lime sludge with water to remove substantially all of the sodium hydroxide and adding aluminum sulphate to produce a mixture of satin white and calcium carbonate.

4. Process of converting lime sludge into a pigment suitable for use in coated paper which comprises washing crude lime sludge with water to remove substantially all of the sodium hydroxide, adding aluminum sulphate to produce a mixture of satin white and calcium carbonate, and grinding the resulting product.

5. Process of converting lime sludge into a pigment suitable for use in coated paper which comprises washing crude lime sludge with water to remove substantially all of the sodium hydroxide, treating the washed sludge with aluminum sulphate to combine with substantially all of the calcium hydroxide to produce a mixture of calcium carbonate and satin white.

6. Process of converting lime sludge into a pigment suitable for use in coated paper which comprises washing crude lime sludge with water to remove substantially all of the sodium hydroxide, neutralizing the calcium hydroxide in the resulting product with aluminum sulphate and grinding the resulting mixture of calcium carbonate and satin white.

7. Process of converting lime sludge into a pigment suitable for use in coated paper which comprises washing crude lime sludge with water to remove substantially all of the sodium hydroxide and grinding the washed sludge in a substantially closed mill in the presence of aluminum sulphate.

8. Process of converting lime sludge into a pigment suitable for use in coated paper which comprises washing crude lime sludge with water to remove substantially all of the sodium hydroxide and grinding the washed sludge in a substantially closed mill with the addition of aluminum sulphate in amount sufficient to combine with the calcium hydroxide to form a mixture of satin white and calcium carbonate.

9. A pigment suitable for use in the production of coated paper comprising the finely ground reaction product of lime sludge with sufficient aluminum sulphate to combine with the free alkali in the lime sludge.

10. A pigment suitable for use in the production of coated paper comprising the finely ground reaction product of lime sludge with sufficient aluminum sulphate to combine with the calcium hydroxide in the lime sludge to form satin white.

11. A pigment suitable for use in the production of coated paper comprising a finely ground mixture of substantially pure calcium carbonate and about 5 to 15% of satin white, such as may be produced by the admixture with lime sludge of sufficient aluminum sulphate to combine with the free alkali of the lime sludge.

In testimony whereof, I affix my signature.

VINCENT A. LAUDERMAN.